(12) United States Patent  
Plattenburg et al.

(10) Patent No.: US 10,872,372 B2
(45) Date of Patent: Dec. 22, 2020

(54) VEHICLE TRANSACTION PROCESSING

(71) Applicants: Brian Plattenburg, Atlanta, GA (US); Gregory James Sirmans, Cumming, GA (US)

(72) Inventors: Brian Plattenburg, Atlanta, GA (US); Gregory James Sirmans, Cumming, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 14/447,073

(22) Filed: Jul. 30, 2014

(65) Prior Publication Data

US 2016/0035013 A1   Feb. 4, 2016

(51) Int. Cl.
*G06Q 30/06*   (2012.01)
*H04W 76/10*   (2018.01)

(52) U.S. Cl.
CPC ........ *G06Q 30/0641* (2013.01); *H04W 76/10* (2018.02)

(58) Field of Classification Search
CPC ......... G07F 13/025; G07F 7/00; B67D 7/145; B67D 7/0401; G07C 5/008; G06Q 20/202
USPC ........................................................ 235/381
See application file for complete search history.

(56) References Cited

U.S. PATENT DOCUMENTS

| | | | | |
|---|---|---|---|---|
| 5,557,529 A * | 9/1996 | Warn | ........................ | G07F 7/00 235/380 |
| 6,098,879 A * | 8/2000 | Terranova | .............. | B67D 7/067 235/380 |
| 6,574,603 B1 * | 6/2003 | Dickson et al. | ................ | 705/15 |
| 2009/0272181 A1 * | 11/2009 | Stedman | .................... | 73/114.71 |
| 2012/0303531 A1 * | 11/2012 | Betancourt | ............ | G06Q 20/20 705/44 |
| 2014/0006188 A1 * | 1/2014 | Grigg | ..................... | G06Q 20/20 705/17 |
| 2014/0171108 A1 * | 6/2014 | Waters | .................... | H04W 4/02 455/456.1 |
| 2014/0351138 A1 * | 11/2014 | Frieden | ................ | G06Q 20/325 705/44 |

* cited by examiner

*Primary Examiner* — Thien M Le
*Assistant Examiner* — Tae W Kim
(74) *Attorney, Agent, or Firm* — Schwegman, Lundberg & Woessner

(57) ABSTRACT

A vehicle pulls up to a fuel pump and a customer within the vehicle utilizes interfaces available within the vehicle to initiate a fuel transaction within the vehicle and to activate the fuel pump for dispensing fuel. The customer then exits the vehicle dispenses fuel and returns to the vehicle without interacting with the existing fuel pump interface and when the customer re-inserts the pump hose into a holster of the fuel pump, the fuel transaction is completed on behalf of the customer.

10 Claims, 4 Drawing Sheets

VEHICLE TRANSACTION PROCESSING

BACKGROUND

For some time customers have been able to purchase gas at a gas station without the assistance of an attendant. A customer exits the car, selects the payment type, inserts a payment card, and then selects the type of gas desired before the pump is activated and the fuel is pumped. This is entirely achieved outside the vehicle at the pump, which also services as a kiosk device for pumping fuel.

In some cases, the outside elements (at the pump) are not very hospitable to the customer; there can be strong winds, heavy rain, blowing rain, freezing rain, extreme cold, snow, and the like. But, the customer has to exit the vehicle to pump his/her fuel needed for his/her car, and at present there is no way for the customer to advance activate the pump and pay for the fuel purchase without also performing interactions outside the car at the pump.

The process and procedure for pumping fuel at a gas station has changed very little over the last three decades.

Therefore, there is a need for improved fuel transacting at gas stations.

SUMMARY

In various embodiments, improved vehicle transaction processing is presented. According to an embodiment, a method for in-vehicle transaction processing is provided.

Specifically, a vehicle is automatically detected at a facility. Next, facilitation of an in-vehicle connection to a device at the facility is established. Finally, the device and vehicle transact over the in-vehicle connection for a transaction.

DETAILED DESCRIPTION

Figure 1:
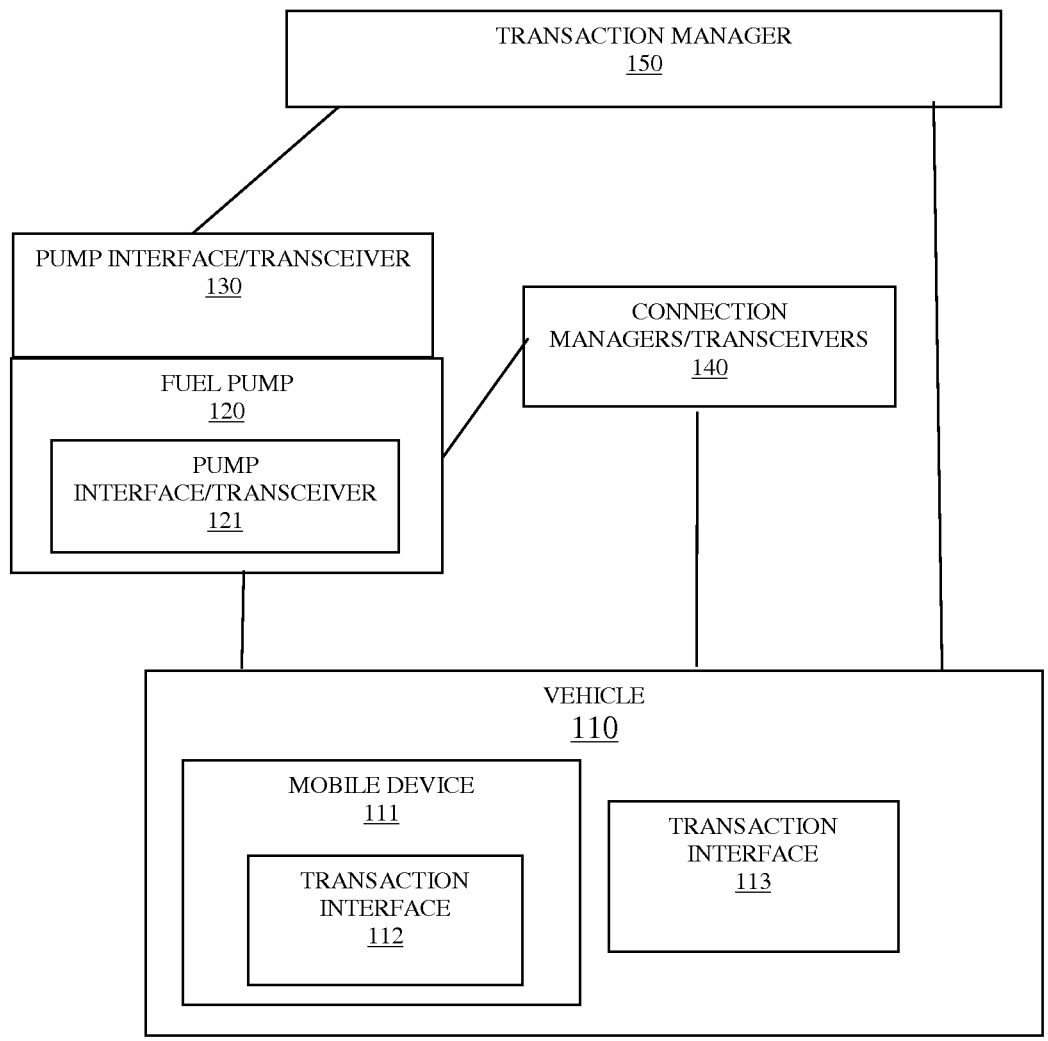
FIG. 1 is a diagram of an in-vehicle transaction processing system for transacting within a vehicle, according to an example embodiment.

FIG. 1 is a diagram of an in-vehicle transaction processing system for transacting within a vehicle, according to an example embodiment. The components of the in-vehicle transaction processing system are shown in greatly simplified form with only those components shown necessary for the understanding of the various embodiments of the invention.

The in-vehicle transaction processing system includes a vehicle 110, a fuel pump 120, and a transaction manager 150. Optionally, the in-vehicle transaction processing system includes a fuel pump interface/transceiver 130 and/or one or more connection managers/transceivers 140. The vehicle 110 includes one or more of a mobile device 111 of a customer and/or a transaction interface 113. Any mobile device 111 includes a transaction interface 112.

The vehicle 110 may or may not include a mobile device 111 associated with either the driver of the vehicle 110 or a passenger of the vehicle. When a mobile device 111 is present, the mobile device 111 may include a transaction interface 112 (mobile application). The transaction interface 112 permits interaction from within the vehicle with the fuel pump 120 either directly through a built-in pump interface/transceiver 121 or directly through an external pump interface/transceiver 130.

Alternatively, the transaction interface 112 may indirectly communicate with the fuel pump 120 through the connection manager/transceiver 140 and/or the transaction manager 150.

The vehicle 110 may also be equipped with its own built-in vehicle transaction interface 113.

It is noted that either the mobile device 111 (when present) or the vehicle 110 when equipped with the built-in interface 113 includes wireless communication capabilities, such as but not limited to Bluetooth Low Energy (BLE), Radio Frequency (RF), Bluetooth, WiFi, OnStar® (built in cellular), cellular, and the like. The wireless communication permits the mobile device (located within the vehicle 110) and/or the vehicle 110 to directly communicate with the fuel pump 120 or indirectly communicate with the fuel pump through the connection managers/transceivers 140 and/or the transaction manager 150.

The fuel pump 120 may include a built-in pump interface/transceiver 121 or include an externally affixed pump interface/transceiver 130. The pump interfaces/transceivers 121 and 130 permits communication with one or more of: the transaction interface 112 of the mobile device 111, the transaction interface 113 of the vehicle 111, the connection managers/transceivers 140, and the transaction manager 150.

In an embodiment, the fuel pump 120 does not include any new or enhanced interface and is a legacy or existing fuel pump having an interface that exists within the fuel pump 120 that permits the fuel pump 120 to communicate with the transaction manager 150 over a network connection.

In an embodiment, the pump interfaces/transceivers 121 add 130 include a BLE transceiver for communicating a presence of the pump 120 and facilitating a connection between the in-vehicle mobile device 111 or the mobile device 110 (through the transaction interface 113 built-in to the vehicle 110).

In an embodiment, the pump interfaces/transceivers 121 and 130 include a RF transmitter and receiver for communicating a presence of the pump 120 and facilitating a connection between the in-vehicle mobile device 111 or the mobile device 110 (through the transaction interface 113 built-in to the vehicle 110).

In an embodiment, the pump interfaces/transceivers 121 and 130 include a Bluetooth transceiver for communicating a presence of the pump 120 and facilitating a connection between the in-vehicle mobile device 111 or the mobile device 110 (through the transaction interface 113 built-in to the vehicle 110).

In an embodiment, the pump interfaces/transceivers 121 and 130 include a WiFi transceiver for communicating a presence of the pump 120 and facilitating a connection between the in-vehicle mobile device 111 or the mobile device 110 (through the transaction interface 113 built-in to the vehicle 110).

One or more connection managers/transceivers 140 may exist locally at a fuel station as well (in some configurations of the in-vehicle transaction processing system). A connection manager/transceiver 140 broadcast a signal within a configured geographic range around the fuel station, such that the signal can be detected by the transaction interface 112 and/or the transaction interface 113. Each connection manager/transceiver 140 may also facilitate a direct connection between the transaction interface 112 and/or 113 with the pump 120. Alternatively, each connection manager/transceiver 140 may act as an intermediary between the transaction interface 112 and/or 113 and the pump 120.

In an embodiment, the connection managers/transceivers 140 are positioned in different perimeter locations about the fuel station and use triangulation or other techniques to determine the geographic position of the vehicle 110 relative to the pump 120 or other pumps at the fuel station. This may be useful when just some of the pumps 120 at the fuel station are equipped to handle in-vehicle transaction processing. In fact, a message can be initially sent to the transaction interface 112 and/or 113 informing the driver/customer that a particular pump 120 or set of pumps are equipped for in-vehicle transaction processing. This initial informational message can also be sent from the pump 120 through either the pump interface/transceiver 121 and/or 130. The connection managers/transceivers 140 are local to the fuel station where the pump 120 is located.

The transaction manager 150 may be remotely located over a network connection and may be a service available in a cloud processing environment. The transaction manager can identify a customer/driver based on the mobile device 111 and/or the vehicle 110 (through the transaction interface 113). The transaction manager may also maintain a profile for the customer/driver that include such things as, by way of example only, preferred type of fuel, preferred card or account for payment, loyalty information, transaction history, preference for performing a transaction (level of interaction required by the customer through the transaction interface 112 and/or 113), manner in which receipt is to be received (text, email, none at all, printed by the pump 12), and the like.

A variety of operational scenarios are possible with the in-vehicle transaction processing system depending upon the configuration of the fuel station and the vehicle. Some are discussed now to fully appreciate the various embodiments of the invention for in-vehicle transaction processing, but it is to be understood that others can exist as well without departing from the teachings presented herein.

The vehicle 110 is traveling and is in need of fuel. The vehicle 110 either has a mobile device 111 with the transaction interface 112 having a cellular connection or the vehicle 110 has a built-in transaction interface 113. The customer/driver may affirmative access the transaction interface 112 and/or 113 and request a nearest fuel station equipped with in-vehicle processing and receive directions thereto, the request sent and processed by the transaction manager 150. Alternatively, the transaction manager 150 may regularly push notifications to the transaction interfaces 112 and 113 as the vehicle 110 nears or is within a configurable distance of a fuel station equipped with in-vehicle transaction processing.

As the vehicle 110 enters the fuel station, the transaction interfaces 112 and 113 are activated to connect to either the connection managers/transceivers 140 or the pump interface/transceiver 121 and/or 130. The position of the vehicle 110 may also be tracked relative to the pump 120 or other pumps using triangulation or other wireless mechanisms.

In an embodiment, as the vehicle 110 enters the fuel station a camera (not shown in the FIG. 1) situated at the fuel station and position to read license plates can identify the vehicle and car and communicate over a network connection to the transaction manager 150. Assuming, the customer has registered the license plate for his/her vehicle 110 with the transaction manager 150, the transaction manager can send cellular messages to the transaction interfaces 112 and/or 113 to instruct the customer on which pump 120 to use for in-vehicle transaction processing. So, in this scenario, the vehicle may not need any wireless connection to any connection managers/transceivers 140 or to any pump interface/transceiver 121 and/or 130 because interaction can occur entirely from within the vehicle 110 to the transaction manager 150 and from the transaction manager 150 to the pump 120 (using one of the pump interfaces/transceivers 121 and/or 130, or using an existing legacy interface of the pump 120 to which the transaction manager 150 has access to. So, the entire in-vehicle transaction processing can be cloud based and no new equipment is necessary for its operation and integration.

Once the vehicle 110 is situated at the pump 120, the vehicle 110 can use the transaction interface 112 and/or 113 to make a connection to the pump interface/transceiver 121 and/or 131; or use the connection manager/transceiver 140; or use the transaction manager 150 (as discussed above).

Next, the customer (using the transaction interface 112 and/or 113) can make a payment selection, provide payment information, request or not request a receipt, and select a grade of fuel for dispensing. This is either directly communicated to the pump 120 through the pump interface/transceiver 121 and/or 130, or indirectly communicated to the pump 120 through the connection manager/transceiver 140 and/or the transaction manager 150. The pump 120 is activated and the select fuel grade is activated. The customer then exists the vehicle 110 lifts the proper fuel hose and dispenses the fuel into the, when done the customer returns to the car and leaves. In this manner, all transaction processing occurs within the vehicle 110; the customer only exits the vehicle 110 to dispense fuel and then returns to the vehicle. The customer does not interact with existing external situated pump interface and may only acquire a printed receipt if selected as an option from within the vehicle 110 prior to exiting the vehicle for dispensing the fuel.

In an embodiment, the transaction manager 150 manages a profile for the customer such that the customer may need to make no selections at all via the transaction interface 112 and/or 113 because a default fuel grade, method of receiving or not receive a receipt, and payment card is automatically supplied by the transaction manager 150 on behalf of the customer. So, the customer may just confirm the default settings and do nothing more but exit the car and dispense the fuel. In some cases, even the confirmation can be bypassed if desired by the customer, such that the customer performs no actions at all with the transaction interface 112 and/or 113 and just pulls up to the pump, exits, and dispenses the fuel; all the transaction details are handled on behalf of the customer by the transaction manager 150. One fully appreciates that such a scenario significantly streamlines the fuel transactions at fuel stations.

It is also to be noted that the transaction is initiated before the customer exits the vehicle 110, but until the amount of purchase fuel is know the transaction is not finalized. So, once the customer puts the hose back into its holster at the pump 120, the transaction manager 150 completes the transaction on behalf of the customer.

In an embodiment, there can be numerous fuel pumps 120 each with a pump interface/transceiver 121 and/or 130 at a fuel station. All or many of the pump interfaces/transceivers 121 and 130 each transmitting its unique Media Access Control (MAC) address via a BLE beacon (transceiver 121 or 130). The mobile device 111 or vehicle 110 receives each of the MAC addresses, via the transaction interface 112 and/or 113, and automatically determines the distance to each BLE beacon (and therefore each fuel pump 120) based on the BLE signal strength. If the mobile device 111 or vehicle 110 determines that it is within some configurable distance (say 15 feet) of one or more of the BLE beacons, then the transaction interface 112 or 113 sends the MAC address of the closest beacon to the transaction manager 150 (which knows which fuel pumps 120 are associated with which MAC addresses) and the transaction between the mobile device 111 (in-vehicle) or vehicle 110 proceeds. In this embodiment, there is not any two-way direct communication between the mobile device 111 or vehicle 110 and the fuel pump 120 (communication occurs indirectly with the transaction manager 150 acting as an intermediary).

In an embodiment, when the customer re-enters the vehicle 110 after pumping the fuel, the transaction interface 112 and/or 113 may provide a variety of other options to the customer, such as purchase a car wash, purchase a snack, etc. If the customer elects to make such a purchase, a code is delivered to the transaction interface 112 and/or 113 within the vehicle 110 for the customer to use to obtain the purchased good or service.

In an embodiment, the transaction interfaces 112 and/or 113 also permit receipt of fuel prices for the various grades of fuel to be viewed by the customer within the vehicle 110.

In an embodiment, the transaction manager 150 also manages gas rewards on behalf of the customer such that the rewards can be applied and the new price for the fuel based on redeemed rewards displayed to the customer within the vehicle 110.

In an embodiment, the customer uses the transaction interface 112 and/or 113 to enter a loyalty number for the fuel transaction within the vehicle 110.

One now appreciates how a variety of components can be arranged with new elements or existing elements at fuel stations to provide in-vehicle transaction processing, such that the customer only needs to exit the vehicle 110 to dispense fuel and nothing more.

Figure 2:
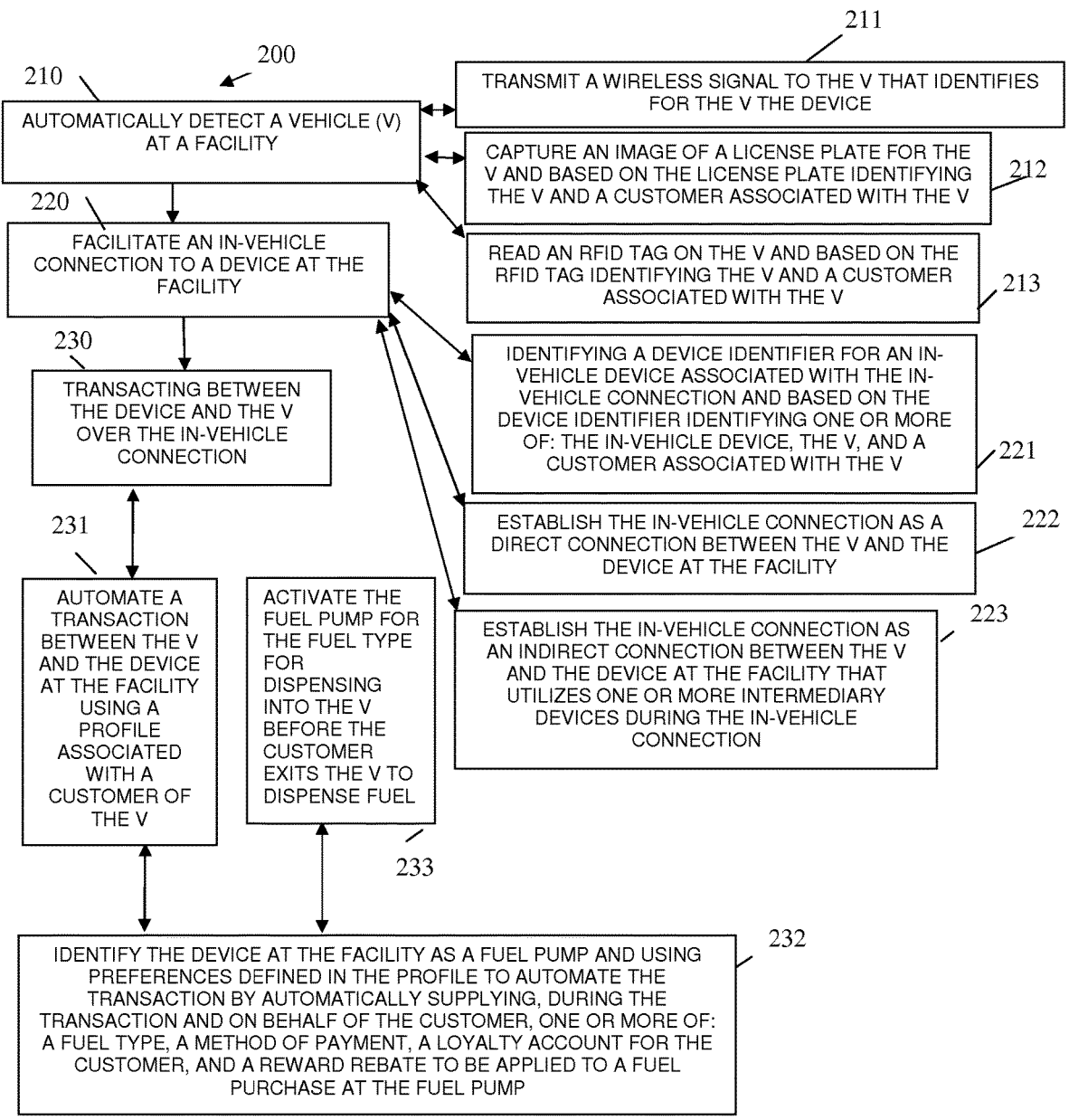
FIG. 2 is a diagram of a method for in-vehicle transaction processing, according to an example embodiment.
Figure 3:
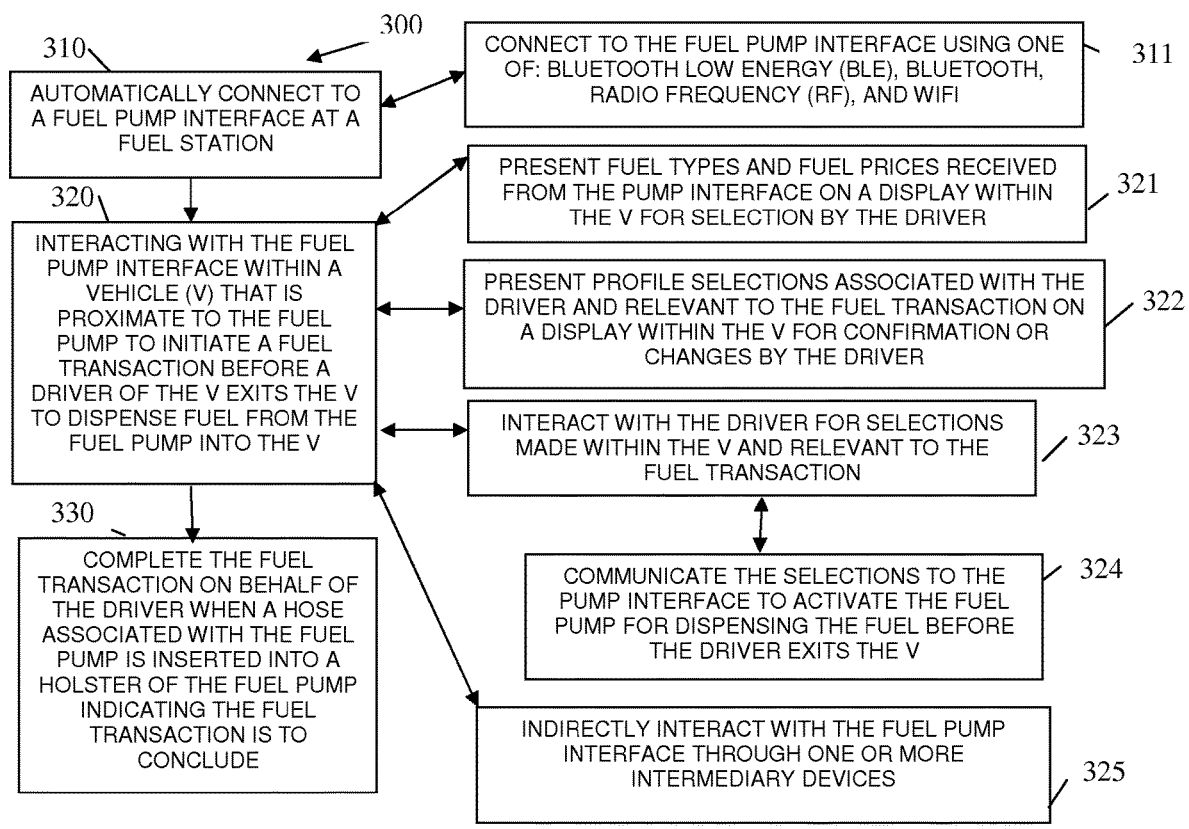
FIG. 3 is a diagram of another method for in-vehicle transaction processing, according to an example embodiment.
Figure 4:
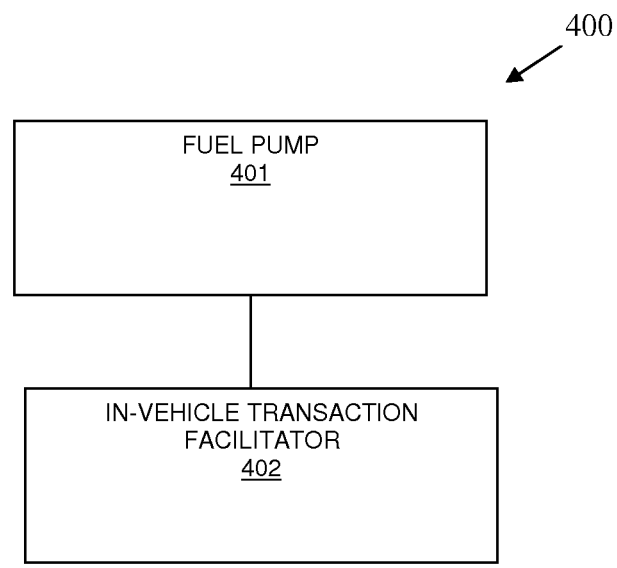
FIG. 4 is a diagram of an in-vehicle transaction processing system, according to an example embodiment.

The above-discussed embodiments and other embodiments are now presented with the discussions of the FIGS. 2-4.

FIG. 2 is a diagram of a method 200 for in-vehicle transaction processing, according to an example embodiment. The method 200 (hereinafter "vehicle transaction manager") is implemented as instructions programmed and residing in memory or on a non-transitory computer-readable (processor-readable) storage medium and executed by one or more processors of one or more devices. The processors are specifically configured and programmed to process the vehicle transaction manager. The vehicle transaction manager may also operate over one or more networks. The networks are wired, wireless, or a combination of wired and wireless.

In an embodiment, the vehicle transaction manager is an instance of the one of the connection managers/transceivers 140 of the FIG. 1.

In an embodiment, the vehicle transaction manager is the pump interface/transceiver 121 of the FIG. 1.

In an embodiment, the vehicle transaction manager is the pump interface/transceiver 130 of the FIG. 1.

In an embodiment, the vehicle transaction manager is the transaction manager 150 of the FIG. 1.

In an embodiment, the vehicle transaction manager is a combination of one or more of the components: 140, 121, 130, and 150 of the FIG. 1.

At 210, the vehicle transaction manager automatically detects a vehicle at a facility. This is an automated process requiring no human interaction whatsoever. Examples of the components within the vehicle and/or the facility where the vehicle enters were provided above with reference to the FIG. 1.

According to an embodiment, at 211, the vehicle transaction manager transmits a wireless signal to the vehicle that identifies for the vehicle the device (facility device discussed below at 220). This can be any of a variety of wireless signals, such as but not limited to: BLE, RF, Bluetooth, and WiFi.

In an embodiment, at 212, the vehicle transaction manager captures an image of a license plate for the vehicle and based on the license plate identifies the vehicle and a customer associated with the vehicle. The license plate may be previous registered by the customer, such that the vehicle and the customer are known based on a captured and optical character recognition performed on the image of the license plate.

In an embodiment, at 213, the vehicle transaction manager reads an RFID tag on the vehicle and based on the RFID tag identifies the vehicle and a customer associated with the vehicle.

At 220, the vehicle transaction manager facilitates an in-vehicle connection to a device at the facility. That is, an in-vehicle device or an integrated device of the vehicle is connected to a device associated with the facility.

In an embodiment, at 221, the vehicle transaction manager identifies a device identifier for the device for an in-vehicle device associated with the in-vehicle connection and based on the device identifier; the vehicle transaction manager identifies one or more of: the in-vehicle device, the vehicle, and a customer associated with the vehicle.

According to an embodiment, at 222, the vehicle transaction manager establishes the in-vehicle connection as a direct connection between the vehicle and the device at the facility.

In an embodiment, the device at the facility is a fuel pump.

In an embodiment, the in-vehicle device is a mobile device.

In an embodiment, the in-vehicle device is an integrated device that is integrally part of the vehicle.

In an embodiment, at 223, the vehicle transaction manager establishes the in-vehicle connection as an indirect connection between the vehicle and the device at the facility that utilizes one or more intermediary devices during the in-vehicle connection. This was discussed above with reference to the FIG. 1. There can be a remote network based transaction manager 150, one or more connection managers/transceivers 140, and/or a pump interface/transceiver 121 or 130.

At 230, the vehicle transaction manager transacts between the device and the vehicle over the in-vehicle connection. This occurs while the customer is in the vehicle. The customer does not directly interact with the device and the device interface (such as a fuel pump interface); rather, the customer utilizes an interface in the vehicle to transaction with the device interface to complete a transaction.

According to an embodiment, at 231, the vehicle transaction manager automates a transaction between the vehicle and the device at the facility using a profile associated with the customer of the vehicle. This can further streamline and automate the interaction of the customer with the in-vehicle device. In fact, all interaction can be excluded by the customer when the profile permits default selections to be automatically applied on behalf of the customer with the device interface at the facility.

In an embodiment of 231 and at 232, the vehicle transaction manager identifies the device at the facility as a fuel pump and uses preferences defined in the profile to automate the transaction by automatically supplying, during the transaction and on behalf of the customer, one or more of: a fuel type, a method of payment, a loyalty account for the customer, and a reward rebate to be applied to a fuel purchase at the fuel pump.

In an embodiment of 232 and at 233, the vehicle transaction manager activates the fuel pump for the fuel type for dispensing into the vehicle before the customer exits the vehicle to dispense fuel.

In an embodiment, the vehicle is an all-electric car that performs in-vehicle transacting with an electronic charging station.

In an embodiment, the vehicle is a car.

In an embodiment, the vehicle is a boat that pulls in and docks at a fueling station or port.

FIG. 3 is a diagram of another method 300 for in-vehicle transaction processing, according to an example embodiment. The method 300 (hereinafter "in-vehicle transaction manager") is implemented as instruction and programmed within memory or a non-transitory computer-readable (processor-readable) storage medium that executes on one or more processors of one or more devices; the processors of the devices are specifically configured to execute the in-vehicle transaction manager. The in-vehicle transaction manager may also be operational over one or more networks; the networks may be wireless.

The in-vehicle transaction manager presents transaction processing from within a vehicle at a fuel station.

In an embodiment, the vehicle is an all-electric car and the fuel station is a charging station.

In an embodiment, the vehicle is a car and the fuel station is a gas station.

In an embodiment, the vehicle is a boat that pulls into a fuel docking station for fuel from a waterway.

In an embodiment, the in-vehicle transaction manager is the transaction interface 112 of the FIG. 1, which processes on a mobile device as a mobile application (mobile app).

In an embodiment, the in-vehicle transaction manager is the transaction interface 113 of the FIG. 1, which processes on one or more processors integrated into the vehicle 110.

In an embodiment, the in-vehicle transaction manager is a combination of the transaction interface 112 and 113 that cooperate with one another within the vehicle 110.

The in-vehicle transaction manager interacts with the vehicle transaction manager of the FIG. 2 to perform in-vehicle transaction processing at a fuel pump.

At 310, the in-vehicle transaction manager automatically connects to a fuel pump interface at a fuel station. This can be achieved without any human interaction; it is a device-to-device connection.

According to an embodiment, at 311, the in-vehicle transaction manager connects to the fuel pump interface using one of: BLE, Bluetooth, RF, and WiFi.

At 320, the in-vehicle transaction manager interacts with the fuel pump interface within a vehicle that is proximate to the fuel pump to initiate a fuel transaction before a driver of the vehicle exits the vehicle to dispense fuel from the fuel pump into the vehicle.

In an embodiment, at 321, the in-vehicle transaction manager presents fuel types and fuel prices received from the pump interface on a display within the vehicle for selection by the driver. In an embodiment, the display is associated with a mobile device located within the vehicle, such as a mobile phone, tablet, laptop computer, a portable GPS device, or wearable processing device. In an embodiment, the display is associated with a display integrated into the vehicle.

According to an embodiment, at 322, the in-vehicle transaction manager presents profile selections associated with the driver and relevant to the fuel transaction on a display within the vehicle for confirmation or changes by the driver. The display can be any display described above with reference to the embodiment of 321.

In an embodiment, at 323, the in-vehicle transaction manager interacts with the driver for selections made within the vehicle and relevant to the fuel transaction, such as method of payment, fuel type (grade), rebates, loyalty account, and the like.

In an embodiment of 323 and at 324, the in-vehicle transaction manager communicates the selections to the pump interface to activate the fuel pump for dispensing the fuel before the driver exits the vehicle. This is a situation where the in-vehicle transaction manager is directly communicating with the fuel pump interface.

In an embodiment, at 325, the in-vehicle transaction manager indirectly interacts with the fuel pump interface through one or more intermediary devices, as was discussed at length above with the discussion of the FIGS. 1 and 2.

According to an embodiment, at 330, the in-vehicle transaction manager completes the fuel transaction on behalf of the driver when the hose associated with the fuel pump is inserted into a holster of the fuel pump indicating that the fuel transaction is to conclude.

In an embodiment, the vehicle is equipped with vehicle-to-vehicle communication and the in-vehicle transaction manager is an enhancement to the vehicle-to-vehicle communication system within the vehicle.

FIG. 4 is a diagram of an in-vehicle transaction processing system 400, according to an example embodiment. The components of the in-vehicle transaction processing system 400 are implemented as executable instructions and programmed within a non-transitory computer-readable (processor-readable) storage medium that execute on one or more processors of one or more devices; the processors are specifically configured to execute the components of the in-vehicle transaction processing system 400. The in-vehicle transaction processing system 400 may also be operational over one or more networks; any such networks may be wired, wireless, or a combination of wired and wireless.

The retail management system 400 includes a fuel pump 401 and an in-vehicle transaction facilitator 402.

In an embodiment, the fuel pump 401 is an electronic charging station.

In an embodiment, the fuel pump 401 is a gas dispensing fuel pump.

In an embodiment, the fuel pump 401 is a boat fuel dispensing pump situated on a waterway.

In an embodiment, the fuel pump 401 is the fuel pump 120 of the FIG. 1.

The in-vehicle transaction facilitator 402 is adapted and configured to: execute on one or more devices, establish an in-vehicle connection between a pump interface of the fuel pump 401 and a vehicle device of a vehicle that is situated at the fuel pump 401, and facilitate during the in-vehicle connection a fuel transaction between the fuel pump 401 and the vehicle.

The mechanisms for achieving the configured features of the in-vehicle transaction facilitator 402 were described above with reference to the FIGS. 1-3 and are incorporated by reference herein with the in-vehicle transaction processing system 400.

In an embodiment, the in-vehicle transaction facilitator 402 is the transaction manager 150 of the FIG. 1.

In an embodiment, the in-vehicle transaction facilitator 402 is one or more instances of the connection managers/transceivers 140 of the FIG. 1.

In an embodiment, the in-vehicle transaction facilitator 402 is the pump interface/transceiver 130 of the FIG. 1.

In an embodiment, the in-vehicle transaction facilitator 402 is the pump interface/transceiver 121 of the FIG. 1.

In an embodiment, the in-vehicle transaction facilitator 402 is a combination of one or more of the components: 150, 140, 130, and 121 of the FIG. 1.

In an embodiment, the in-vehicle transaction facilitator 402 is the method 200 of the FIG. 2.

According to an embodiment, the in-vehicle transaction facilitator 402 is one or more of: a cloud-based service, an on-site service situated at a fuel station having the fuel pump 401, an externally interfaced service interfaced to the fuel pump 401, and an internally integrated service of the fuel pump 401.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
automatically pushing, by a transaction manager executing on a processor of a cloud processing environment, notifications to a transaction interface operational within a vehicle as the vehicle is within a first configurable distance of a facility;
automatically detecting, by the transaction manager, the vehicle at the facility through notification sent from the transaction interface operational within the vehicle;
tracking and reporting, by the transaction interface of the vehicle, a position of the vehicle at the facility relative to devices of the facility based on wireless signal strengths received from transceivers of the devices and noted by the transaction interface and reported by the transaction interface;
identifying, by the transaction interface of the vehicle, a device among the devices based on a strongest one of the wireless signal strengths that is provided by that device's transceiver and noted by the transaction interface, and providing, by the transaction interface, a Media Access Control (MAC) address that identifies the device, wherein providing further includes sending, by the transaction interface, the MAC address when the vehicle is within a second configurable distance from the device;
facilitating, by the transaction interface of the vehicle, the device's transceiver, and the transaction manager, an in-vehicle connection to the device at the facility by at least one or more automated informational messages sent to the transaction interface operational within the vehicle that identifies the device to the vehicle and other devices equipped for connecting over the in-vehicle connection;
initiating, by the transaction manager, a transaction at the device before the customer exists the vehicle for the transaction by activating a fuel pump for dispensing fuel, wherein the device is the fuel pump;
automatically transacting, by the device and the transaction interface of the vehicle using the transaction manager and the device's transceiver, over the in-vehicle connection by automatically applying default settings associated with a customer without any human interaction, and wherein the automatically transacting further includes transacting without the customer interacting with the transaction interface of the vehicle, wherein the automatically transacting further includes indirectly transacting between an interface of the device and the transaction interface of the vehicle through the transaction manger that is in communication with the interface of the device and the transaction interface of the vehicle, wherein the interface of the device is an existing and legacy interface of the device that is enabled to transact with the transaction manager but not with the transaction interface of the vehicle, wherein automatically transacting further includes obtaining a profile for the customer of the vehicle and using a level of interaction required by the customer and defined by a preference for performing transactions in the profile to perform the transaction;
processing the automatically pushing, the automatically detecting, the tracking and reporting, the identifying, the facilitating, and the automatically transacting without the customer interacting with any existing external situated device interface; and
finalizing, by the transaction manager, the transaction when the customer returns a fuel hose back into a holster at the fuel pump.

2. The method of claim 1, wherein automatically detecting further includes transmitting a wireless signal to the vehicle that identifies for the vehicle the device.

3. The method of claim 1, wherein automatically detecting further includes capturing an image of a license plate for the vehicle and based on the license plate identifying the vehicle and the customer associated with the vehicle.

4. The method of claim 1, wherein automatically detecting further includes reading a Radio Frequency Identification (RFID) tag on the vehicle and based on the RFID tag identifying the vehicle and the customer associated with the vehicle.

5. The method of claim 1, wherein facilitating further includes identifying a device identifier for an in-vehicle device associated with the in-vehicle connection and based on the device identifier identifying one or more of: the in-vehicle device, the vehicle, and the customer associated with the vehicle.

6. The method of claim 1, wherein facilitating further includes establishing the in-vehicle connection as a direct connection between the vehicle and the device at the facility.

7. The method of claim 1, wherein facilitating further includes establishing the in-vehicle connection as an indirect connection between the vehicle and the device at the facility that utilizes one or more intermediary devices during the in-vehicle connection.

8. The method of claim 1, wherein transacting further includes identifying the device at the facility as the fuel pump and using the preference for performing transactions to automate the transaction by automatically supplying, during the transaction and on behalf of the customer: a fuel type, a method of payment, a loyalty account for the customer, and a reward rebate to be applied to a fuel purchase at the fuel pump.

9. The method of claim 8, wherein transacting further includes activating the fuel pump for the fuel type for dispensing into the vehicle before the customer exits the vehicle to dispense fuel.

10. The method of claim 1, wherein the second configured distance is 15 feet.

* * * * *